United States Patent Office 3,520,865
Patented July 21, 1970

3,520,865
TREATMENT OF DIENE ELASTOMERS WITH BORON COMPOUNDS
Gottfried Pampus and Nikolaus Schön, Leverkusen, and Josef Witte, Cologne-Stammheim, Germany, assignors to Farbriken Bayer Aktiengesellschaft, Leverkusen, Germany, a corporation of Germany
No Drawing. Continuation of application Ser. No. 531,742, Mar. 4, 1966. This application Jan. 23, 1969, Ser. No. 810,893
Int. Cl. C08d 3/14, 5/02; C08f 27/00
U.S. Cl. 260—92.3            5 Claims

ABSTRACT OF THE DISCLOSURE

Treatment of diene elastomers with boron-hydrogen compounds to improve cold flow properties without substantial increase in the molecular weight of the elastomer.

---

The application is a continuation of application Ser. No. 531,742, filed Mar. 4, 1966, now abandoned.

Butadiene or isoprene polymers prepared in solution using organometallic catalysts, have a number of interesting and industrially important properties. For this reason, stereospecifically polymerised diene elastomers now fulfill an important function in the rubber industry. Some processes have already been described, whose object is further to improve certain properties of crude rubber or vulcanisates. For example, attempts have been made to increase the molecular weight by incorporating alkylation catalysts, and to reduce cold flow at the expense of only a slight increase in molecular weight. One disadvantage of these processes, however, is that the alkylation catalyst has to be quantitatively deactivated and its often harmful secondary products must be removed from the highly viscous polymer solutions.

It has now been found that the properties of diene elastomers can be improved by a process in which a solution or dispersion of a diene elastomer in a solvent is heated to temperatures in the range from 10 to 170° C. in the presence of a boron-hydrogen compound.

It is possible, by treating diene elastomers by the process according to the invention, appreciably to improve cold flow in particular without, at the same time, substantially increasing the molecular weight of the polymers. Accordingly, there is hardly any change in the Mooney viscosity ML–4′. It is also possible, however, to carry out the treatment in such a way that the molecular weight, and hence the Mooney viscosity, too, are increased. This is necessary in cases where it is intended to blend the diene elastomer with a rubber-extending oil. This improvement in properties, particularly the reduction in cold flow, is also noticeable in the case of polydienes treated in accordance with the invention and blended with extending oils. Oil-extending itself may be carried out with any of the conventional extending oils by the conventional methods, either during or after the treatment according to the invention with boron-hydrogen compounds.

The particular advantage of the treatment according to the invention may be explained as follows:

In the working-up of solutions of diene elastomers by conventional methods, the catalyst is decomposed by the addition of compounds having acidic hydrogen atoms, lower carboxylic acids or lower alcohols in particular. In this case, strongly acidic decomposition products, for example, hydrochloric acid, are formed from the catalysts. Decomposition of the catalyst and separation of the decomposition products present additional difficulties in cases where it is intended to add Lewis acids to the polymer solution on completion of polymerisation, or in cases where an organometallic mixed catalyst is converted by certain additives into a cationic alkylation catalyst. For this reason, decomposition has to be completed very carefully, and, following deactivation, the product has to be removed equally carefully from these decomposition products, for example by extracting or washing the polymer solution.

The boron-hydrogen compounds used in accordance with the invention not only enable improved diene polymers to be prepared, they also enable the polymerisation catalysts to be deactivated without at the same time giving rise to the formation of strongly acidic decomposition products. Accordingly, when these boron-hydrogen compounds are added to the polydiene solution which is formed during polymerisation and in which the catalyst is still present, it is no longer necessary to deactivate the catalyst or to remove its decomposition products. It is, of course, also possible to deactivate the catalyst in the usual way and subsequently to treat the solutions or dispersions with boron-hydrogen compounds. In other words, the process is preferably used for the treatment of organic solutions of diene polymers of the kind which are formed during solution polymerization and in which the polymerisation catalyst is still present.

Although, in principle the process may be used for any type of diene polymer, it is preferably used for polymers of butadiene, isoprene, piperilene and chlorobutadiene, and for their co-polymers with vinyl or vinylidene compounds, for example styrene and acrylonitrile. Polybutadiene, and 1,4-cis-polybutadiene in particular, is preferred. These polymers and copolymers can be prepared with catalysts comprising the reaction products of a transition metal compound and the reducing agents. Suitable transition metal compounds are for instance the halides of a Group IV–VIII metal, such as titanium, cobalt and nickel compounds. The reducing agents may be metals or metal compounds of a Group I–III metal. Suitable catalysts are for example catalysts comprised of titanium tetrachloride or titanium tetraiodide and trialkyl aluminum, a cobalt salt and an alkyl aluminum chloride. Furthermore, lithium or organo-lithium compounds, such as lithium alkyls, may be used as catalysts.

The polymers may be in the form of solutions or dispersions. Suitable solvents are, for example, aromatic hydrocarbons and chlorohydrocarbons (e.g., benzene, chlorobenzene, toluene or xylene) and aliphatic hydrocarbons, preferably $C_5$–$C_{12}$-hydrocarbons (e.g., pentane, isooctane, dodecane or mixtures thereof), or aliphatic chlorohydrocarbons (e.g., chloroform, carbon tetrachloride, trichloroethylene or trichloroethane). If these solvents do not dissolve the polymers, they may be used as the continuous phase of dispersions. Water can be used as the continuous dispersion phase and the elastomers may be dispersed therein as such or in the form of solutions in organic solvents.

The reaction according to the invention is carried out at temperatures in the range from 10 to 170° C. The boron-hydrogen compound is conveniently used in quantities from 0.5 to 5% by weight, preferably 0.2 to 2% by weight, based on rubber.

Boron-hydrogen compounds suitable for the purposes of the invention, are boranes corresponding to the general formula $B_nH_{n+4}$ and $B_nH_{n+6}$, in which $n$ is an integer from 2 to 10 and preferably the addition products of boranes with amines.

Examples of such boranes are diborane, pentaborane and decaborane.

Amines suitable for the preparation of addition products with boranes, the aminoboranes or borazanes, are secondary and tertiary amines, for example secondary and tertiary alkyl amines having 1 to 8 carbon atoms in each alkyl group, such as trimethylamine, diethylamine, triethylamine, tri-n-butylamine, diisobutylamine, di-(2-ethyl-n-hexyl)-amine, alkylene diamines having secondary and/or tertiary amine groups and 2 to 8 carbon atoms in the alkylene chain, such as N-methyl-N',N'-diethylethylene diamine, N-ethyl-N',N'-dimethyl-tetramethylene diamine, tetramethylethylene diamine, heterocyclic nitrogen compounds such as N-methylpyrrolidine, N-methylpiperidine, pyridine, quinoline and N-ethylcarbazole. Examples of such adducts are N-triethylborazane, the adducts of pyridine with pentaborane, N-diethylborazane.

The borazanes (aminoboranes) may be prepared according to the processes disclosed in British Pats. Nos. 889,599, 889,600, 877,863 and in the paper "Borazane," published by H. Nölk in Berichte 93 (1960), pages 928–938. The preferred borazanes are addition products of 1 mol of $BH_3$ and 1 mol of a monoamine or 2 mols of $BH_3$ and 1 mol of a diamine. Furthermore, there may be used the reaction products of the aforementioned amines and tetraborane ($B_4H_{10}$) which are equimolar mixtures of compounds of the formula

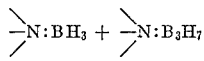

There is no standard method of measuring the cold flow. It is expressed in mg./min. and is defined as the quantity of rubber in mg. forced per minute through a 3 mm. diameter bore at a temperature of 50° C. and a pressure of 1.86 kg./cm.$^2$. The instrument used to measure cold flow is similar to an efflux consistometer.

EXAMPLE 1

A 15% by weight solution of polybutadiene with a 1,4-cis-bond content of 94%, is prepared in a known process by polymerising butadiene in toluene as the solvent with a metal complex catalyst based on $TiCl_4$-iodine $AlR_3$. The quantity in which the catalyst is used, and its composition, are such that the resulting rubber has a Mooney value (ML–4') of 28. Following the addition of 0.5 g. of a phenolic stabiliser, per 100 g. of rubber, and 1.0 g. of stearic acid per 100 g. of rubber, the polybutadiene solution is mixed with 0.3 g. of N-triethyl borazane $((C_2H_5)_3N:BH_3)$ per 100 g. of rubber, and the resulting mixture is left to stand for 1 hour at 60° C. The solvent is then removed by treatment with boiling water and steam and the residual rubber crumbs are dried. The product obtained is considerably lighter in colour and has a much weaker odour than an untreated comparison product. It has a Mooney-value (ML–4') of 49 and a cold flow of 6.2 mg./min.

Mooney viscosities (ML–4') referred to in this specification are determined at 100° C. as described in ASTM D–927–55T and represent the viscosity values obtained using the large rotor, after four minutes running time.

EXAMPLE 2

A 10% by weight solution of polybutadiene is prepared by polymerising butadiene in benzene with a metal complex catalyst based on titanium-butoxy triiodide and aluminum triisobutyl. The catalyst is used in such a quantity that a polymer with a Mooney value (ML–4') of 46 is formed. On completion of polymerisation, the solution is mixed with 0.5 g. of N-diethyl borazane $((C_2H_5)_2NH:BH_3)$ per 100 g. of polybutadiene, heated for 10 minutes at 90° C. and then mixed with a solution of 2 g. of a phenolic stabiliser in 1 litre of alcohol to precipitate the polybutadiene. The resulting product is dried for a few hours at 80° C. in a vacuum drying cabinet, after which it has a Mooney value (ML–4') of 56. The cold flow of the material is now scarcely measurable.

EXAMPLE 3

2 g. of disproportionated resin acid, 0.7 g. of a phenolic stabiliser and 0.4 g. of N-tributyl borazane $((C_4H_9)_3N:BH_3)$, are added to a polybutadiene solution prepared as in Example 2. The mixture is left to stand for three hours at 40° C., after which 37.5 g. of a mineral oil with a high content of aromatics are stirred in, and the solvent is removed with steam. An oil-extended polybutadiene is obtained which has a Mooney value (ML–4') of 42, has only a limited cold flow and is eminently suitable for the preparation of vulcanisable mixtures for the production of tyre treads.

We claim:
1. A process for improving the properties of a diene elastomer selected from the group consisting of homopolymers of butadiene, isoprene, piperylene and chlorobutadiene and copolymers of said monomers with vinyl and vinylidene monomers, said process comprising heating a solution or dispersion of said diene elastomer in a liquid medium at temperatures in the range of 10 to 170° C., while in contact with 0.5 to 5% by weight, based on the weight of said diene elastomer, of a boron-hydrogen compound selected from the group consisting of $B_nH_{n+4}$ and $B_nH_{n+6}$ wherein $n$ is an integer from 2 to 10 and addition products of said boron-hydrogen compounds with a member selected from the group consisting of secondary and tertiary alkyl amines having 1 to 8 carbon atoms in each alkyl group, alkylene diamines having secondary and/or tertiary alkyl amine groups with 2 to 8 carbon atoms in the alkylene moiety thereof, N-methylpyrrolidine, N-methylpiperidine, pyridine, quinoline and N-ethylcarbazole.

2. The process of claim 1 wherein said boron-hydrogen compound is used in an amount of 0.2 to 2% by weight, based on the weight of said diene elastomer.

3. The process of claim 1 wherein said boron-hydrogen compound is N-triethylborazane.

4. The process of claim 1 wherein said boron-hydrogen compound is N-diethylborazane.

5. The process of claim 1 wherein said boron-hydrogen compound is N-tributylborazane.

References Cited

UNITED STATES PATENTS

| 3,211,710 | 10/1965 | Hendriks et al. | 260—85.3 |
| 3,317,503 | 5/1967 | Naylor | 260—94.3 |
| 3,328,376 | 6/1967 | Beinemann et al. | 260—94.3 |

FOREIGN PATENTS

| 877,863 | 9/1961 | Great Britain. |
| 889,599 | 2/1962 | Great Britain. |
| 889,600 | 2/1962 | Great Britain. |
| 664,459 | 6/1963 | Canada. |
| 992,210 | 5/1965 | Great Britain. |

OTHER REFERENCES

Borazane by H. Noth and H. Beyer, Berichte 93 (1960), pages 928–938.

JOSEPH L. SCHOFER, Primary Examiner

W. F. HAMROCK, Assistant Examiner

U.S. Cl. X.R.

260—94.7, 96, 83.3, 85.1